No. 784,162. PATENTED MAR. 7, 1905.
C. W. HUNT.
MEANS FOR HANDLING MERCHANDISE, &c.
APPLICATION FILED DEC. 21, 1904.
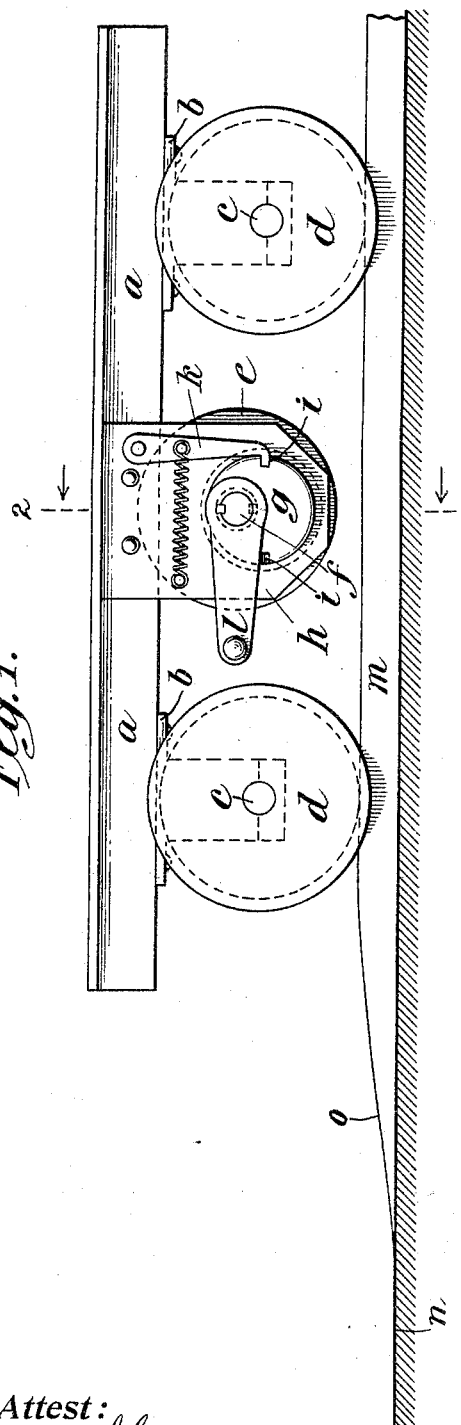
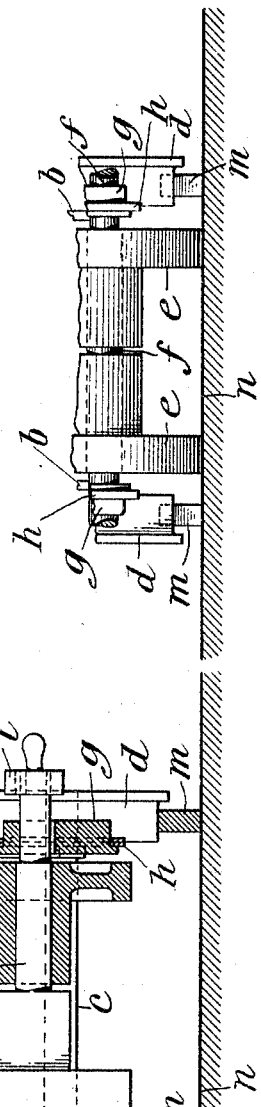
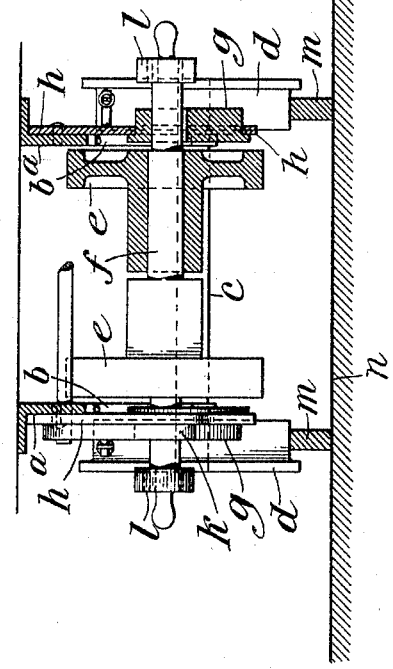
Attest:
Inventor:
Charles Wallace Hunt
by Redding, Kiddle & Greeley
Attys.

No. 784,162.

Patented March 7, 1905.

UNITED STATES PATENT OFFICE.

CHARLES WALLACE HUNT, OF NEW YORK, N. Y.

MEANS FOR HANDLING MERCHANDISE, &c.

SPECIFICATION forming part of Letters Patent No. 784,162, dated March 7, 1905.

Application filed December 21, 1904. Serial No. 237,772.

*To all whom it may concern:*

Be it known that I, CHARLES WALLACE HUNT, a citizen of the United States, residing in West New Brighton, in the borough of Richmond, in the city of New York, in the State of New York, have invented certain new and useful Improvements in Means for Handling Merchandise, &c., of which the following is a specification, reference being had to the accompanying drawings, forming a part hereof.

In the operation of industrial railways it has not been practicable heretofore to handle the cars independently of the rails upon which they are arranged to travel. The cars which are employed on such railways have wheels flanged, so that it is impracticable to change the direction of movement of such cars upon a floor without rails. In many instances, as in warehouses and in foundries, where there is necessity for considerable trackage and where it would also be desirable to permit the cars to be loaded or discharged at many different points, it would be highly advantageous to have the cars run upon the floor independently of the rails.

It is therefore the object of this invention to provide for the accomplishment of such an advantageous result and, moreover, to permit such result to be accomplished without requiring the exertion of undue effort in effecting the change from rails to floor, or vice versa, and without occasioning any interference with the operation of the cars upon the rails. In attaining this object each car is provided between its fixed end trucks with an intermediate truck which can be raised out of the way, so that the car may pass freely over switches, crossovers, &c., and can be lowered so that its bearing-surface shall be below the plane of the treads of the fixed wheels and below the plane of the flanges of such wheels to take the load and permit the car to be swung in one direction or another in the manner of an ordinary cart and to be moved forward or backward upon such truck. To permit the shifting of the load from the fixed trucks to the intermediate truck, and vice versa, the ways provided for the end trucks and for the intermediate truck, respectively, are disposed in such different horizontal planes as to permit the movable truck to be lowered without resting upon the way provided for it and are approached by relative inclines, so that as the car is moved forward from the rails the movable truck will gradually take the load and when the car is moved in the opposite direction the fixed trucks will gradually take the load. By this means the movable truck can be raised or lowered without requiring the load to be lowered or raised and without special exertion.

The invention will be more fully explained hereinafter with reference to the accompanying drawings, in which it is illustrated as embodied in a convenient and practical structure, and in which—

Figure 1 is a view in side elevation of a car constructed in accordance with the invention, the relatively inclined and elevated ways being also shown. Fig. 2 is a view, partly in elevation and partly in section, on the plane indicated by the line 2 2 of Fig. 1; and Fig. 3 is a partial view in detail showing the relations of the wheels and ways as the load is transferred from the end trucks to the intermediate truck.

In the embodiment of the invention represented in the drawings the body of the car or frame thereof is indicated at $a$, two fixed trucks being represented as secured thereto at convenient points near the ends thereof. These fixed trucks may be of any suitable construction and in the drawings are shown as comprising pedestals $b$, axles $c$, and flanged track-wheels $d$. Between the fixed trucks is located a movable intermediate truck, which, as will be evident, might have a single wheel or might have two wheels arranged either inside or outside of the lines of the fixed-truck wheels. As shown in the drawings, however, the intermediate truck preferably comprises two flangeless wheels $e$, which are mounted for independent rotation upon an axle $f$, so that when the load is supported by these two wheels the car can be readily swung in one direction or the other. For the convenient raising and lowering of this truck the axle $f$ may be keyed fast in eccentrics $g$. The latter is shown as mounted in suitable supports $h$, rigidly secured to the frame of the car-body and as notched, as at $i$, for engagement by dogs $k$ to lock the eccentrics in one position or the other. There is also secured to the shaft $f$, preferably at each end thereof, a handle $l$, by means of which the shaft may be given a half-rotation in either direction.

In the ordinary use of the car upon the rails provided therefor, the load being then carried by the end trucks and its track-wheels $d$, the handles $l$ are turned to the position indicated in Fig. 1, whereby through the action of the eccentrics $g$ in their supports the axle $f$ and the wheels $e$ are raised to their highest position, so that the wheels will not interfere with the free movement of the car over switches, crossovers, &c. At whatever point it is desired to provide for the transfer of the load from the fixed trucks to the intermediate truck, so that the car may be swung easily in one direction or the other upon the floor and may be moved readily over the floor, the rails or other way $m$, provided for the end truck-wheels $d$, and the floor or other way $n$, provided for the intermediate truck, are disposed in such different horizontal planes that when the wheels $d$ are resting upon the way $m$ the intermediate truck-wheels $e$ may be lowered to their lowest position without making contact with the way $n$ provided therefor. When this has been done, the car is moved forward, and as the wheels $d$ leave the elevated tracks $m$ and upon the inclines $o$ the intermediate truck will gradually take the weight and the end trucks will be relieved of the weight except as the load may be slightly unbalanced. In this manner the transfer of the load from the end trucks to the intermediate truck is effected without great exertion, and the car can then be handled upon the smooth floor as desired, being swung in this way or that as a cart upon its wheels and being moved forward or back to any desired position. As the car is returned to the tracks the wheels $d$ are run over the incline $o$, gradually taking the weight of the car and its load, if any, and the intermediate truck is relieved and can again be raised to avoid interference with any portion of the track system.

It will be evident that the construction of the car and its trucks can be varied as required to suit different conditions of use and that the invention is not restricted to the precise construction and arrangement of parts shown and described herein.

I claim as my invention—

1. The combination with a car comprising a body, trucks at the end of said body, an intermediate truck and means to raise and lower said intermediate truck, of separate ways for the end trucks and the intermediate truck, said ways being in different horizontal planes and relatively inclined, substantially as described.

2. The combination with a car comprising a body, trucks at the ends of said body, an intermediate truck having independently-rotatable wheels, and means to raise and lower said intermediate truck, of separate ways for the end trucks and the intermediate truck, said ways being in different horizontal planes and relatively inclined, substantially as described.

This specification signed and witnessed this 19th day of December, A. D. 1904.

CHARLES WALLACE HUNT.

In presence of—
CHARLES C. KING,
CHAS. E. SIMONSON.